United States Patent [19]

Bellman et al.

[11] Patent Number: 5,382,203
[45] Date of Patent: Jan. 17, 1995

[54] PLANETARY GEARSET CARRIER ASSEMBLY

[75] Inventors: James C. Bellman, Batavia, Ohio; Dale E. Martin, Novi, Mich.

[73] Assignee: Ford Motor Company, Dearborn, Mich.

[21] Appl. No.: 41,108

[22] Filed: Apr. 1, 1993

[51] Int. Cl.⁶ .............................................. B23B 31/16
[52] U.S. Cl. ...................................... 475/331; 475/346
[58] Field of Search ................................ 475/331, 346

[56] References Cited

U.S. PATENT DOCUMENTS

| | | | |
|---|---|---|---|
| 3,767,887 | 10/1973 | Harder | 219/98 |
| 3,984,653 | 10/1976 | Blaas et al. | 219/98 |
| 4,129,050 | 12/1978 | Akashi et al. | 74/750 R |
| 4,244,241 | 1/1981 | Treadwell | 74/695 |
| 4,392,396 | 7/1983 | Sato et al. | 74/785 |
| 4,574,658 | 3/1986 | Abbott et al. | 74/785 |
| 4,597,311 | 7/1986 | Takeda | 74/694 |
| 4,901,602 | 2/1990 | Matoba | 475/331 |
| 5,019,025 | 5/1991 | Hayakawa et al. | 475/285 |
| 5,145,471 | 9/1992 | Meier-Burkamp | 475/331 |
| 5,215,507 | 6/1993 | Bonig | 475/331 |
| 5,295,925 | 3/1994 | Hirabayashi | 475/331 |

FOREIGN PATENT DOCUMENTS

| | | | |
|---|---|---|---|
| 1315553 | 12/1962 | France | 475/331 |
| 1197709 | 7/1965 | Germany | 475/331 |
| 2855545 | 4/1980 | Germany | 475/331 |
| 227041 | 11/1985 | Japan | 475/331 |

Primary Examiner—John T. Kwon
Attorney, Agent, or Firm—Roger L. May; Frank G. McKenzie

[57] ABSTRACT

A carrier for an automatic transmission of a motor vehicle is provided. The carrier comprises a hub, an annular face plate, a plurality of posts, and a plurality of planetary gears. The hub includes a collar having internal teeth adapted to mesh with an input or an output shaft, and a disc attached to the collar. The posts are generally cylindrical, and extend between the hub and the face plate substantially within the respective perimeters of the hub and the face plate. The planetary gears are disposed in a gear pocket between the hub and the face plate, with each planetary gear being mounted on an associated pinion shaft and adapted to mesh with both a sun gear and a ring gear.

11 Claims, 2 Drawing Sheets

PLANETARY GEARSET CARRIER ASSEMBLY

TECHNICAL FIELD

This invention relates to carriers for automatic transmissions, and more particularly to such a carrier which has a series of structural support posts capacity discharge welded in place to join a hub and a face plate.

BACKGROUND ART

Automatic transmissions for motor vehicles commonly use torque-converter couplings with planetary gear units that can supply one or two gear reductions and reverse, depending on the design, by simultaneously engaging or locking various elements of the planetary gear unit. Typically, a simple planetary gear unit includes a sun gear, a ring gear, and a carrier which supports a plurality of shafts on which are mounted planet or pinion gears. The planetary gearset carrier provides the structure to carry torque through the pinion gears and shafts to an output member, and therefore must be rigid enough to provide gear location without deflection.

Conventional planet carriers are known which are either one piece castings, castings fastened together such as by riveting, or steel multi-piece constructions joined together by laser welding or electron beam welding. For example, the A4LD carrier used by Ford Motor Company, the assignee of the present invention, utilizes a stamped plate having a bent leg which is capacity discharge welded onto radial projections in a hub portion of the carrier.

SUMMARY OF THE INVENTION

The present invention is a carrier for an automatic transmission. The carrier comprises a hub, an annular face plate, a plurality of posts, and a plurality of planetary gears. The hub includes a collar having internal teeth adapted to mesh with an input or an output shaft, and a disc attached to the collar. The posts are generally cylindrical, and extend between the hub and the face plate substantially within the respective perimeters of the hub and the face plate. The planetary gears are disposed in a gear pocket between the hub and the face plate, with each planetary gear being mounted on an associated pinion shaft and adapted to mesh with both a sun gear and a ring gear.

The invention also includes a method of making a carrier for an automatic transmission. The method comprises providing a hub, face plate, and a plurality of planetary gears in a gear pocket between the hub and the face plate. A plurality of generally cylindrical posts having ends shaped for controlled weldment are then capacity discharge welded between the hub and the face plate substantially within their respective perimeters to maintain the gear pocket therebetween.

Accordingly, it is an object of the present invention to provide a carrier of the type described above which has an effective multiple piece construction which is very strong, and is easy to manufacture at a relatively low cost.

Another object of the present invention is to provide a carrier of the type described above which allows flexibility of design in the choice of number of pinions to be used, and a choice of a wide range of materials for use in the hub and the face plate.

Still another object of the present invention is to provide a method of making a carrier of the type described above which utilizes a welding machine having high efficiency, low down time, and is relatively insensitive to power fluctuations.

These and other objects, features, and advantages of the present invention are readily apparent from the following detailed description of the best mode for carrying out the invention when taken in conjunction with the accompanying drawings.

BRIEF DESCRIPTION OF THE DRAWINGS

FIG. 4 is a top view of a post of the carrier; and

FIG. 5 is a cross sectional view of the post taken along line 5—5 in FIG. 4.

BEST MODE FOR CARRYING OUT THE INVENTION

Figure 1:
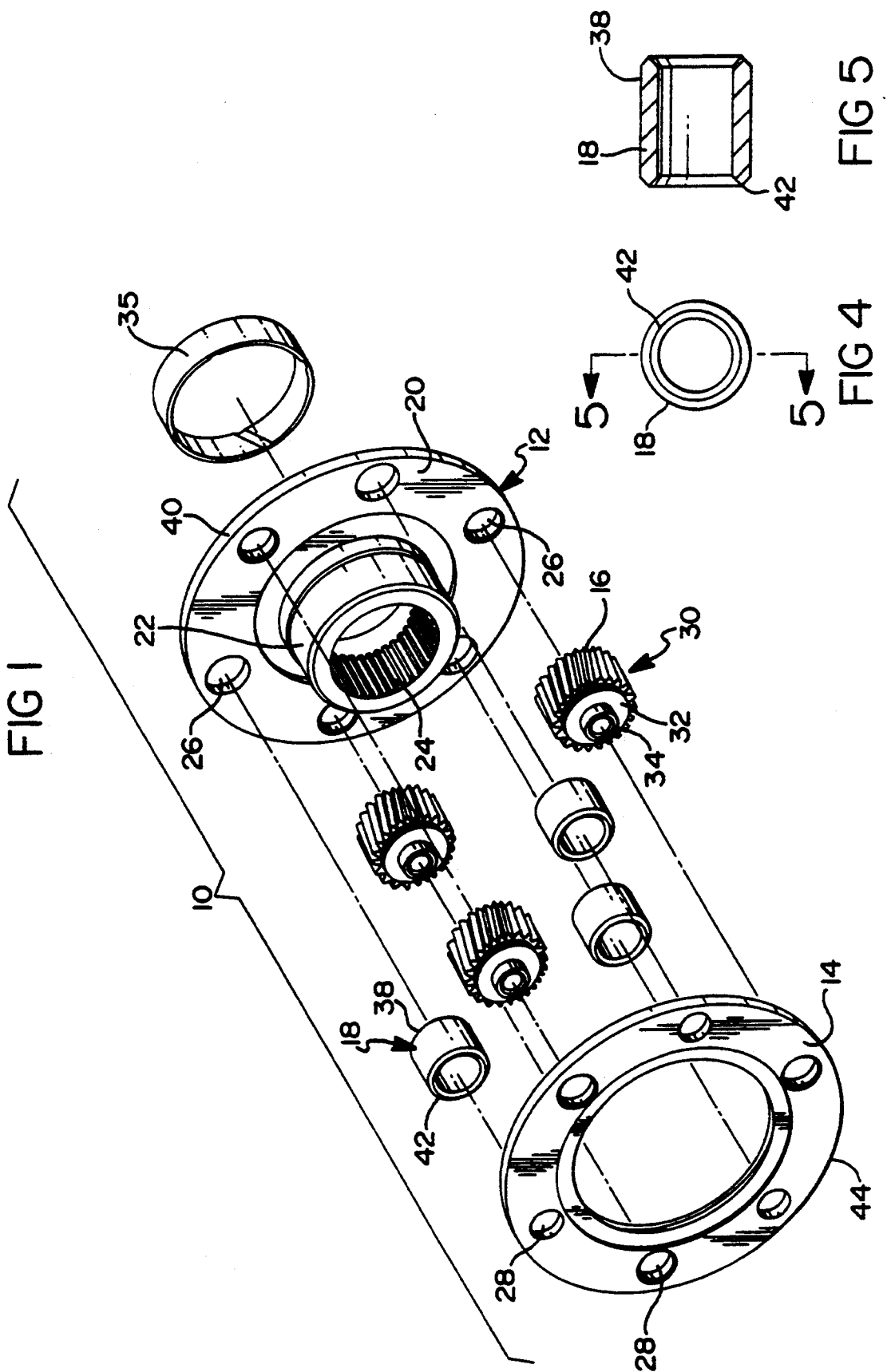
FIG. 1 is an exploded view of a carrier according to the present invention for an automatic transmission.
Figure 2:
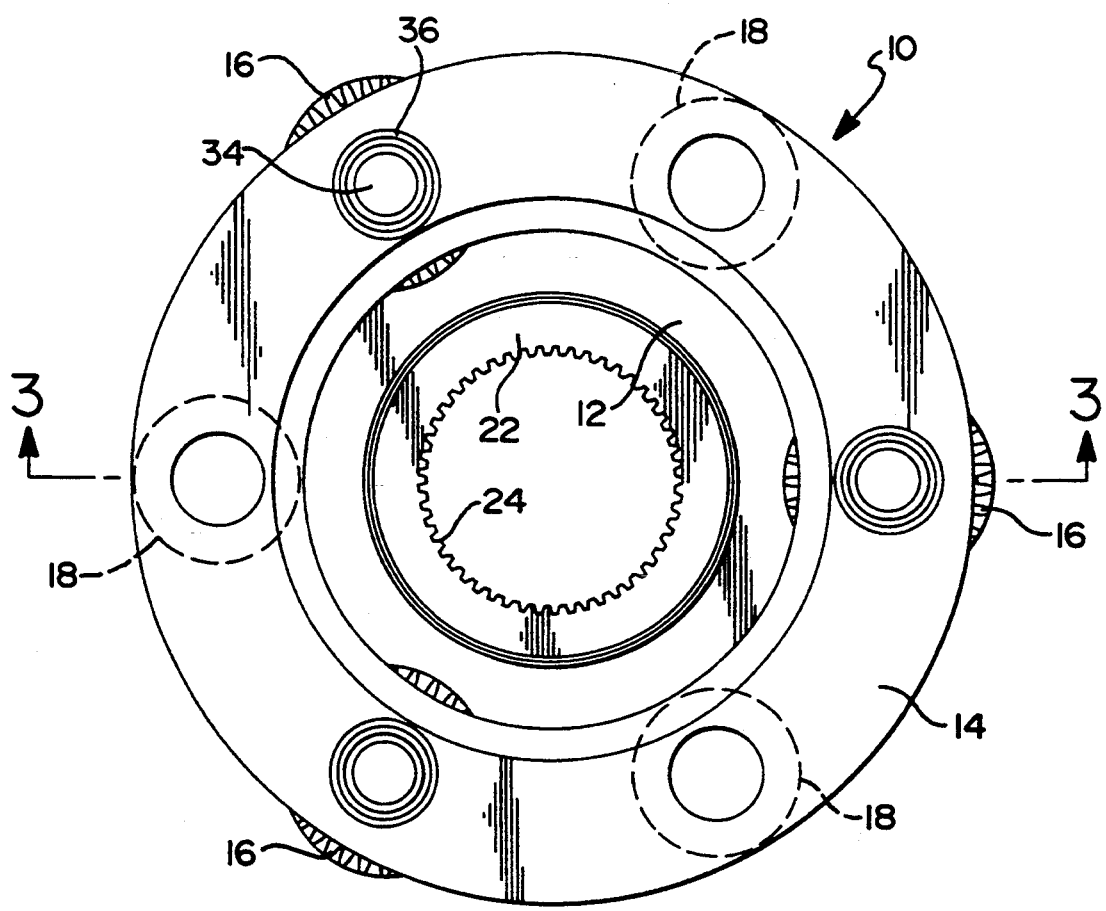
FIG. 2 is a plan view of the carrier.
Figure 3:
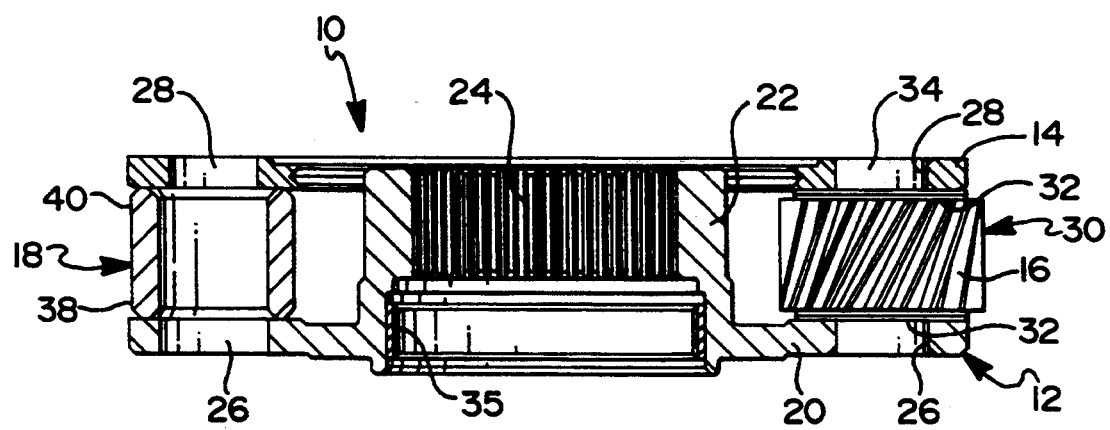
FIG. 3 is a cross sectional view of the carrier taken along line 3—3 in FIG. 2.

With reference to the drawings, the preferred embodiments of the present invention will be described. FIGS. 1 through 3 show a carrier 10 according to the present invention for an automatic transmission of a motor vehicle. The carrier comprises a hub 12, an annular face plate 14, a plurality of planetary gears 16, and a plurality of posts 18.

The hub 12 includes an annular disc 20 and an axially extending collar 22 integrally attached to the disc. The collar 22 has internal teeth 24 adapted to mesh with an input or an output shaft, depending on the purpose to which the carrier 10 is dedicated, as is well known in the art. The disc 20 is provided with a series of holes 26 spaced equiangularly around the collar 22. In a preferred embodiment shown in FIGS. 1 through 3, there are six holes 26 provided to accept either a structural support post or a pinion gear shaft, as described below.

The face plate 14 is a substantially planar stamping, and is also preferably provided with six holes 28 therethrough. Gear assemblies 30, each of which comprises a pair of thrust washers 32 and a helical planetary gear 16 mounted by needle bearings (not shown) on a pinion shaft 34, are disposed in a gear pocket defined between the hub 12 and the face plate 14. The planetary gears 16 are then in a position to mesh with both a sun gear rotatable on the collar 22, and a ring gear situated around the circumference of the planetary gears, as is known in the art. A bronze bushing 35 is provided for piloting the carrier 10 to the ring gear.

The pinion shafts 34 extend between the hub 12 and the face plate 14, and are upset on the respective exterior sides of the hub and the face plate to form a retaining flange 36, as shown most clearly in FIG. 2. Because the interior side of the disc 20 can be sufficiently smoothed prior to assembly by machining, the thrust washers 32 are preferably brass. Although three gear assemblies 30 are shown in the preferred embodiment shown in FIGS. 1 through 3, it should be understood that the carrier 10 can be provided with a sufficient number of holes oriented to accommodate four or more gear assemblies.

The posts 18 are generally cylindrical and hollow, as shown in FIGS. 4 and 5, and extend between the disc 20 of the hub 12 and the face plate 14. A first end 38 of each post 18 is attached to the disc 20 substantially within the perimeter 40 of the disc, while an opposite second end 42 of each post is attached to the face plate 14 substantially within the perimeter 44 of the face plate. The cylindrical shape of the posts 18 provides a relatively high strength to weight ratio, and permits the posts to be positioned for welding without regard for their angular orientation.

The carrier assembly posts 18 are all welded in place at the same time using a capacity discharge weld. For this purpose, the posts 18 are preferably a lower carbon steel, for instance 1010 steel, with the ends 38 and 42 shaped to a pointed rim by cold heading or screw machining as shown in FIGS. 4 and 5 for controlled weldment. The hub 12 and the face plate 14 are preferably formed from a higher carbon steel, for instance 1040 steel. Alternatively, the hub and/or the face plate can be formed from powdered metals.

A 40 kilowatt-second capacity discharge welding machine, available from the Schlemmer company of Essen, Germany, is suitable for performing the capacity discharge weld function. It has been found that this welder has a high efficiency, low down time, and is relatively insensitive to power fluctuations. It has also been found that the heat affected zone resulting from this capacity discharge welding operation is localized, providing minimal distortion. Also, sensitivity to contamination is greatly reduced compared to alternate welding processes such as laser or electron beam welding.

Once welded, the posts 18 provide the structure to the carrier 10. The present invention provides an effective multiple piece carrier construction which is very strong, and is easy to manufacture at a relatively low cost. The present invention also allows flexibility of design, in that either three or four pinions can be accommodated, and a wide range of materials can be selected for use in the hub and the face plate. The most desirable materials are those which provide good and consistent machinability. The present invention also provides good control of the gear pocket width control.

The present invention also includes a method of making a carrier in accordance with the apparatus described above. The method comprises providing a hub and a substantially planar face plate, and providing a plurality of planetary gears in a gear pocket between the hub and the face plate. A plurality of generally cylindrical posts are then welded, preferably by capacity discharge welding, between the hub and the face plate substantially inside the respective perimeters of the hub and face plate. A first end of each post is preferably welded to the hub, while a second end of each post is welded to the face plate, to maintain the gear pocket therebetween.

It should be understood that while the forms of the invention herein shown and described constitute preferred embodiments of the invention, they are not intended to illustrate all possible forms thereof. It should also be understood that the words used are words of description rather than limitation, and various changes may be made without departing from the spirit and scope of the invention disclosed.

We claim:

1. A carrier for an automatic transmission, the carrier comprising:
   a hub;
   a face plate;
   a plurality of hollow posts extending between the hub and the face plate to maintain a gear pocket therebetween; and
   a plurality of planetary gears disposed in the gear pocket.

2. The carrier of claim 1 wherein the hub includes a collar and a disc attached to the collar.

3. The carrier of claim 2 wherein the disc and the face plate both have a perimeter, and the posts extend between the disc and the face plate substantially within their respective perimeters.

4. The carrier of claim 1 wherein there are three posts extending between the hub and the face plate.

5. The carrier of claim 1 wherein the posts are formed from steel.

6. The carrier of claim 1 wherein the posts are generally cylindrical.

7. The carrier of claim 1 wherein the face plate is substantially planar.

8. The carrier of claim 1 wherein the posts have a first end and a second end shaped for controlled weldment.

9. The carrier of claim 1 wherein the posts are welded to the hub and to the face plate.

10. The carrier of claim 1 wherein the posts are capacity discharge welded to the hub and to the face plate.

11. A carrier for an automatic transmission, the carrier comprising:
    a hub including a collar and a disc attached to the collar, the collar having internal teeth adapted to mesh with an input or an output shaft, the disc having a perimeter;
    an annular, substantially planar face plate having a perimeter;
    a plurality of hollow, generally cylindrical posts extending between the hub and the face plate substantially within their respective perimeters; and
    a plurality of planetary gears disposed in a gear pocket between the hub and the face plate, each planetary gear being mounted on an associated pinion shaft.

* * * * *